United States Patent
Nelson et al.

(10) Patent No.: US 12,326,172 B2
(45) Date of Patent: Jun. 10, 2025

(54) MAGNETIC-FOIL BEARING WITH COOLING SYSTEM

(71) Applicant: Raytheon Technologies Corporation, Farmington, CT (US)

(72) Inventors: Alexander R. Nelson, Amston, CT (US); Benstone I. Schwartz, Sanford, FL (US); Philip A. Varney, Coventry, CT (US); Andrew V. Schwendenmann, Hampden, MA (US)

(73) Assignee: RTX CORPORATION, Farmington, CT (US)

( * ) Notice: Subject to any disclaimer, the term of this patent is extended or adjusted under 35 U.S.C. 154(b) by 131 days.

(21) Appl. No.: 18/137,867

(22) Filed: Apr. 21, 2023

(65) Prior Publication Data

US 2024/0352967 A1 Oct. 24, 2024

(51) Int. Cl.
*F16C 17/02* (2006.01)
*F16C 32/04* (2006.01)
*F16C 37/00* (2006.01)

(52) U.S. Cl.
CPC ........ *F16C 32/0402* (2013.01); *F16C 17/024* (2013.01); *F16C 32/0474* (2013.01); *F16C 37/005* (2013.01); *F16C 2360/23* (2013.01)

(58) Field of Classification Search
CPC .......................... F16C 17/024; F16C 32/0402; F16C 32/0474; F16C 32/0476; F16C 32/048; F16C 32/0482; F16C 32/0485; F16C 32/0487; F16C 32/0489; F16C 37/005; F16C 2360/23; F05D 2240/51

See application file for complete search history.

(56) References Cited

U.S. PATENT DOCUMENTS

| | | | |
|---|---|---|---|
| 5,455,470 A | 10/1995 | Denk | |
| 6,135,640 A * | 10/2000 | Nadjafi | F16C 35/02 384/103 |
| 6,965,181 B1 | 11/2005 | Heshmat | |
| 7,002,273 B2 | 2/2006 | Schippl | |

(Continued)

FOREIGN PATENT DOCUMENTS

| | | | |
|---|---|---|---|
| CN | 210949548 U | 7/2020 | |
| EP | 3781828 B1 * | 8/2021 | F01D 15/10 |

(Continued)

OTHER PUBLICATIONS

EP Search Report for EP Patent Application No. 24171397.3 dated Sep. 20, 2024.

*Primary Examiner* — Phillip A Johnson
(74) *Attorney, Agent, or Firm* — Getz Balich LLC

(57) ABSTRACT

A bearing system is provided that includes a stationary structure, a rotating structure, a magnetic-foil bearing and a cooling jacket. The rotating structure is rotatable about an axis. The magnetic-foil bearing radially supports the rotating structure within the stationary structure. The magnetic-foil bearing includes a magnetic bearing stator, a magnetic bearing rotor and a foil bearing. The foil bearing is disposed radially between the magnetic bearing stator and the magnetic bearing rotor. The cooling jacket circumscribes and radially engages the magnetic bearing stator. A cooling circuit is configured to flow cooling fluid within the cooling jacket to cool the magnetic bearing stator.

17 Claims, 10 Drawing Sheets

(56) References Cited

U.S. PATENT DOCUMENTS

| | | | |
|---|---|---|---|
| 7,224,094 B2* | 5/2007 | Shimada | F16C 32/047 |
| | | | 310/58 |
| 7,629,715 B1 | 12/2009 | Sortore | |
| 7,997,057 B1 | 8/2011 | Harris | |
| 8,531,071 B2 | 9/2013 | Klusman | |
| 10,612,592 B2 | 4/2020 | El-Shafei | |
| 10,718,382 B2 | 7/2020 | Guenard | |
| 11,204,038 B2* | 12/2021 | Shi | H01F 5/02 |
| 11,209,046 B2 | 12/2021 | Vikman | |
| 2019/0277337 A1 | 9/2019 | Tzianetopoulou | |

FOREIGN PATENT DOCUMENTS

| | | |
|---|---|---|
| KR | 100928948 B1 | 11/2009 |
| KR | 101562054 B1 | 10/2015 |

\* cited by examiner

MAGNETIC-FOIL BEARING WITH COOLING SYSTEM

BACKGROUND OF THE DISCLOSURE

1. Technical Field

This disclosure relates generally to a bearing and, more particularly, to an active magnetic bearing and a foil bearing.

2. Background Information

A gas turbine engine includes bearings to rotatably support various rotors. Various types and configurations of bearings are known in the art. While these known bearings have various benefits, there is still room in the art for improvement. There is a need in the art, for example, for a bearing which can reduce lubricant and/or cooling demand on turbine engine lubricant and/or cooling systems.

SUMMARY OF THE DISCLOSURE

According to an aspect of the present disclosure, a bearing system is provided that includes a stationary structure, a rotating structure, a magnetic-foil bearing and a cooling jacket. The rotating structure is rotatable about an axis. The magnetic-foil bearing radially supports the rotating structure within the stationary structure. The magnetic-foil bearing includes a magnetic bearing stator, a magnetic bearing rotor and a foil bearing. The foil bearing is disposed radially between the magnetic bearing stator and the magnetic bearing rotor. The cooling jacket circumscribes and radially engages the magnetic bearing stator. A cooling circuit is configured to flow cooling fluid within the cooling jacket to cool the magnetic bearing stator.

According to another aspect of the present disclosure, an assembly is provided for a turbine engine. This assembly includes a stationary structure, a rotating structure, a bearing system and a cooling system. The rotating structure is rotatable about an axis. The bearing system radially supports the rotating structure within the stationary structure. The bearing system includes a magnetic bearing stator, a magnetic bearing rotor and a foil bearing. The foil bearing is disposed radially between the magnetic bearing stator and the magnetic bearing rotor. The cooling system is configured to deliver lubricant to the bearing system to cool the magnetic bearing stator.

According to still another aspect of the present disclosure, another assembly is provided for a turbine engine. This assembly includes a stationary structure, a rotating structure, a bearing and a cooling jacket. The rotating structure is rotatable about an axis. The bearing radially supports the rotating structure within the stationary structure. The bearing includes a magnetic bearing rotor and a magnetic bearing stator circumscribing the magnetic bearing rotor. The magnetic bearing rotor is mounted with the rotating structure. The magnetic bearing stator is mounted with the stationary structure. The cooling jacket circumscribes and radially engages the magnetic bearing stator. A cooling circuit is configured to flow cooling fluid within the cooling jacket to cool the magnetic bearing stator. At least a portion of the cooling circuit within the cooling jacket has a spiral geometry about the magnetic bearing stator.

The bearing may also include a foil bearing radially between the magnetic bearing stator and the magnetic bearing rotor.

The cooling circuit may extend circumferentially within the cooling jacket around the magnetic bearing stator two or more complete revolutions.

At least a portion of the cooling circuit within the cooling jacket may have a spiral geometry about the magnetic bearing stator.

The cooling circuit may include a first leg and a second leg. The first leg may extend within the cooling jacket axially along and circumferentially about a first portion of the magnetic bearing stator to a first outlet of the cooling jacket. The second leg may extend within the cooling jacket axially along and circumferentially about a second portion of the magnetic bearing stator to a second outlet of the cooling jacket.

The first leg may extend within the cooling jacket axially along the first portion of the magnetic bearing stator in a first axial direction along the axis to the first outlet. The second leg may extend within the cooling jacket axially along the second portion of the magnetic bearing stator in a second axial direction along the axis to the second outlet.

The first leg and the second leg may be fluidly coupled to an inlet of the cooling jacket in parallel.

At least a portion of the first leg may have a spiral geometry within the cooling jacket about the magnetic bearing stator. In addition or alternatively, at least a portion of the second leg may have a spiral geometry within the cooling jacket about the magnetic bearing stator.

The first leg may extend within the cooling jacket at least one or more complete revolutions circumferentially about the magnetic bearing stator. In addition or alternatively, the second leg may extend within the cooling jacket at least one or more complete revolutions circumferentially about the magnetic bearing stator.

The cooling circuit may include a first leg, a second leg, a first plenum, a second plenum and a third plenum axially between the first plenum and the second plenum. The first leg may extend axially along and circumferentially about the magnetic bearing stator from the first plenum to the third plenum. The second leg may extend axially along and circumferentially about the magnetic bearing stator from the third plenum to the second plenum.

The first plenum may be configured as or otherwise include an annular first plenum. In addition or alternatively, the second plenum may be configured as or otherwise include an annular second plenum. In addition or alternatively, the third plenum may be configured as or otherwise include an annular third plenum.

The cooling jacket may include an inlet, a first outlet and a second outlet. The inlet may be fluidly coupled to the third plenum. The first outlet may be fluidly coupled to the first plenum. The second outlet may be fluidly coupled to the second plenum.

The bearing system may also include a cooling fluid source fluidly coupled with and configured to provide the cooling fluid to the cooling circuit.

The cooling fluid source may be configured as or otherwise include a flowpath within a turbine engine. The cooling fluid may be compressed air bled from the flowpath.

The cooling fluid source may be configured as or otherwise include a lubricant reservoir. The cooling fluid may be lubricant from the lubricant reservoir.

The magnetic bearing stator may include a stator body and a plurality of windings wrapped around the stator body. The cooling jacket may circumscribe and radially engage the stator body.

The stator body may be configured as other otherwise include a stator lamination.

The foil bearing may include a top foil and a bump foil. The top foil may extend circumferentially about the axis. The bump foil may extend circumferentially about the axis and radially between the magnetic bearing stator and the top foil.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
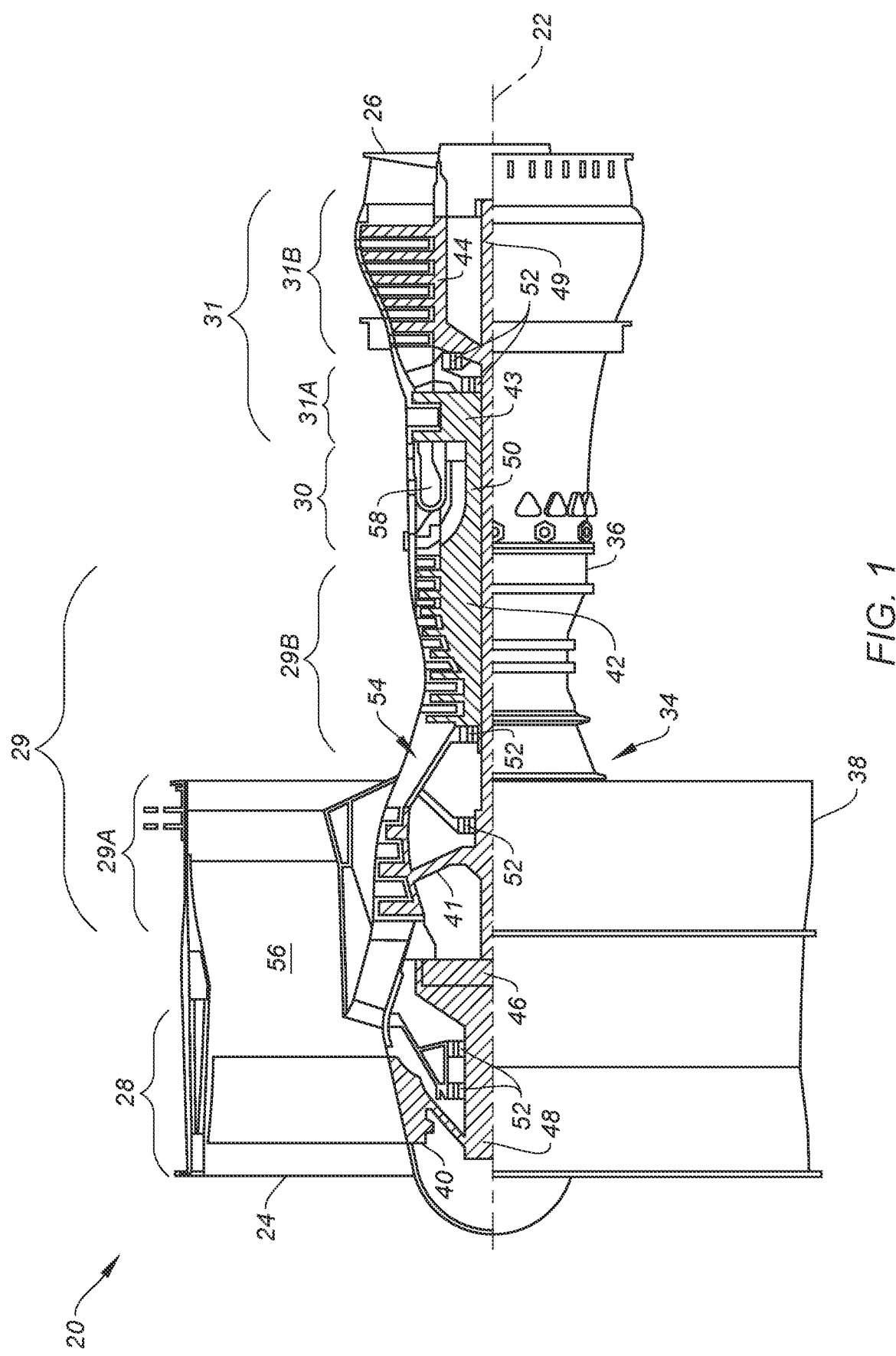
FIG. 1 is a side cutaway illustration of a geared gas turbine engine.

FIG. 1 is a side cutaway illustration of a geared gas turbine engine 20 for an aircraft propulsion system. This turbine engine 20 extends along an axial centerline 22 between an upstream airflow inlet 24 and a downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31B are arranged sequentially along the centerline 22 within an engine housing 34. This engine housing 34 includes an inner case 36 (e.g., a core case) and an outer case 38 (e.g., a fan case). The inner case 36 may house one or more of the engine sections 29A-31B; e.g., a core of the turbine engine 20. The outer case 38 may house at least the fan section 28.

Each of the engine sections 28, 29A, 29B, 31A and 31B includes a respective bladed engine rotor 40-44. Each of these engine rotors 40-44 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 40 is connected to a geartrain 46, for example, through a fan shaft 48. The geartrain 46 and the LPC rotor 41 are connected to and driven by the LPT rotor 44 through a low speed shaft 49. The HPC rotor 42 is connected to and driven by the HPT rotor 43 through a high speed shaft 50. The engine shafts 48-50 are rotatably supported by a plurality of bearings 52. Each of these bearings 52 is connected to the engine housing 34 by at least one stationary support structure such as, for example, an annular support strut.

During turbine engine operation, air enters the turbine engine 20 through the airflow inlet 24. This air is directed through the fan section 28 and into a core flowpath 54 and a bypass flowpath 56. The core flowpath 54 extends sequentially through the engine sections 29A-31B; e.g., the engine core. The air within the core flowpath 54 may be referred to as "core air". The bypass flowpath 56 extends through a bypass duct, which bypasses the engine core. The air within the bypass flowpath 56 may be referred to as "bypass air".

The core air is compressed by the LPC rotor 41 and the HPC rotor 42 and directed into a combustion chamber 58 of a combustor in the combustor section 30. Fuel is injected into the combustion chamber 58 and mixed with the compressed core air to provide a fuel-air mixture. This fuel-air mixture is ignited and combustion products thereof flow through and sequentially cause the HPT rotor 43 and the LPT rotor 44 to rotate. The rotation of the HPT rotor 43 and the LPT rotor 44 respectively drive rotation of the HPC rotor 42 and the LPC rotor 41 and, thus, compression of the air received from a core airflow inlet. The rotation of the LPT rotor 44 also drives rotation of the fan rotor 40. The rotation of the fan rotor 40 propels the bypass air through and out of the bypass flowpath 56. The propulsion of the bypass air may account for a majority of thrust generated by the turbine engine 20, e.g., more than seventy-five percent (75%) of engine thrust. The turbine engine 20 of the present disclosure, however, is not limited to the foregoing exemplary thrust ratio.

A typical roller element bearing utilizes a plurality of roller elements engaged with an inner race and an outer race, where a lubricant film provides a buffer between the roller elements and the inner and the outer races. The engagement between the bearing elements and the inner and the outer races may subject the roller element bearing to relatively high heat loads. While these heat loads may be mitigated by increasing a flow of the lubricant to and through the roller element bearing, such an increase in the lubricant flow increases turbine engine lubrication demands overall. Therefore, in an effort to reduce lubrication and/or cooling demands on the turbine engine 20 as well as increase turbine engine efficiency (e.g., by reducing parasitic losses), any one or more of the bearings 52 may each be configured as a magnetic-foil bearing. The term "magnetic-foil bearing" may describe a bearing which utilizes a magnetic field and/or an air cushion to facilitate rotation of a bearing rotor within a bearing stator. With such a configuration, the bearing rotor may hover within a bore of the bearing stator with little or no contact between the bearing rotor and the bearing stator and without use of lubricant. In addition to reducing lubrication and/or cooling demands on the turbine engine 20 as well as increasing turbine engine efficiency, the magnetic-foil bearing may also improve dynamic properties such as damping.

Figure 2:
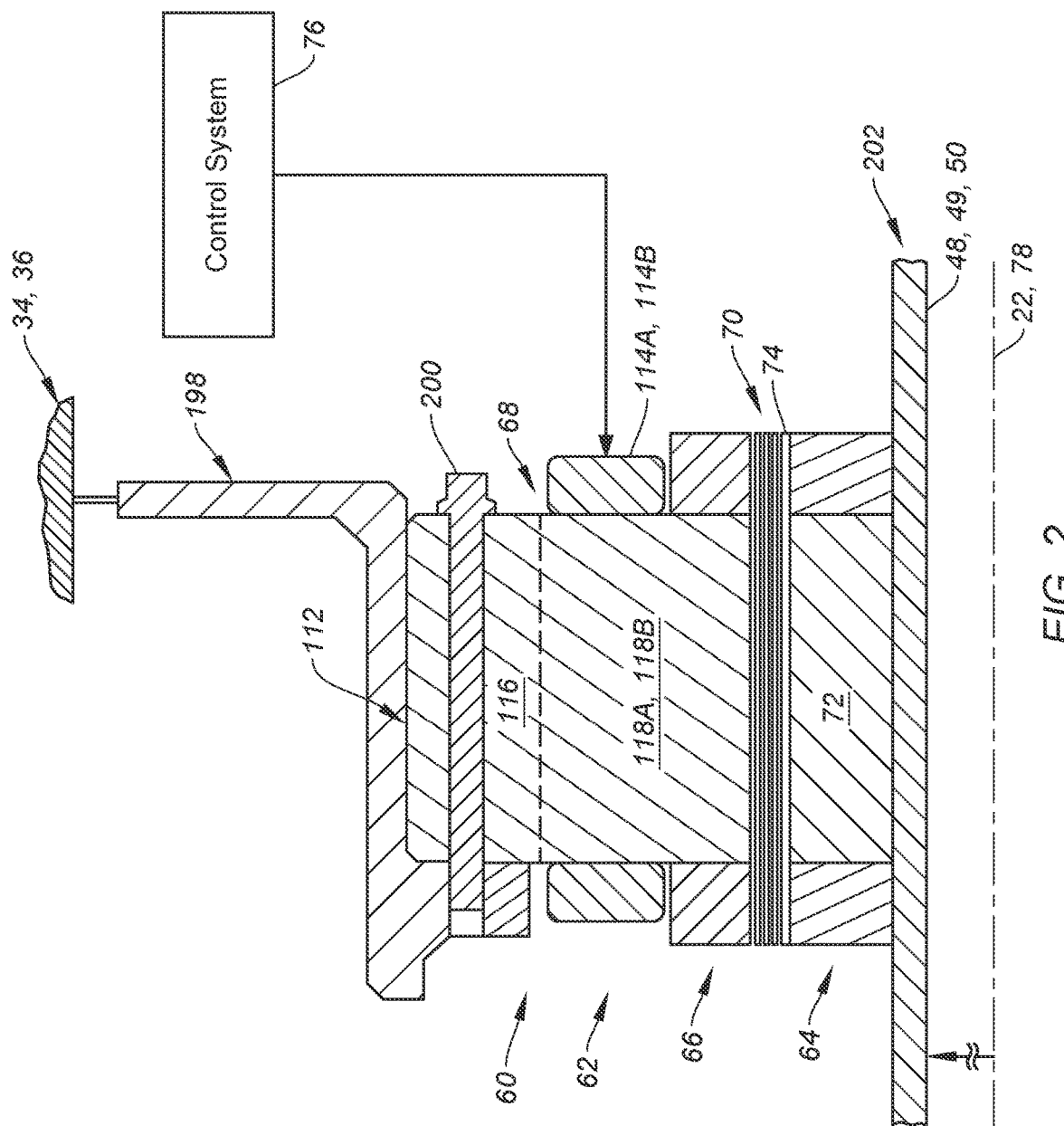
FIG. 2 is a partial side sectional illustration of a magnetic-foil bearing between a stationary structure and a rotating structure.

FIG. 2 illustrates an exemplary magnetic-foil bearing 60. This magnetic-foil bearing 60 is a combination of an active magnetic bearing (AMB) and a foil bearing (FB), which foil bearing may also be referred to as a foil-air bearing or a foil journal bearing. The magnetic-foil bearing 60 of FIG. 2, for example, includes a magnetic-foil bearing (MFB) stator 62 and a magnetic-foil bearing (MFB) rotor 64. The MFB stator 62 of FIG. 2 includes a magnetic-foil bearing (MFB) frame 66 (e.g., a retention structure), a magnetic bearing stator 68 and a foil bearing 70. The MFB rotor 64 of FIG. 2 includes a magnetic bearing rotor 72 and a rotor sleeve 74, where the magnetic bearing rotor 72 is in electromagnetic communication with the magnetic bearing stator 68 (e.g., through the foil bearing 70 and/or the rotor sleeve 74) as described below in further detail. The magnetic-foil bearing 60 also includes an active magnetic bearing (AMB) control system 76.

Figure 3:
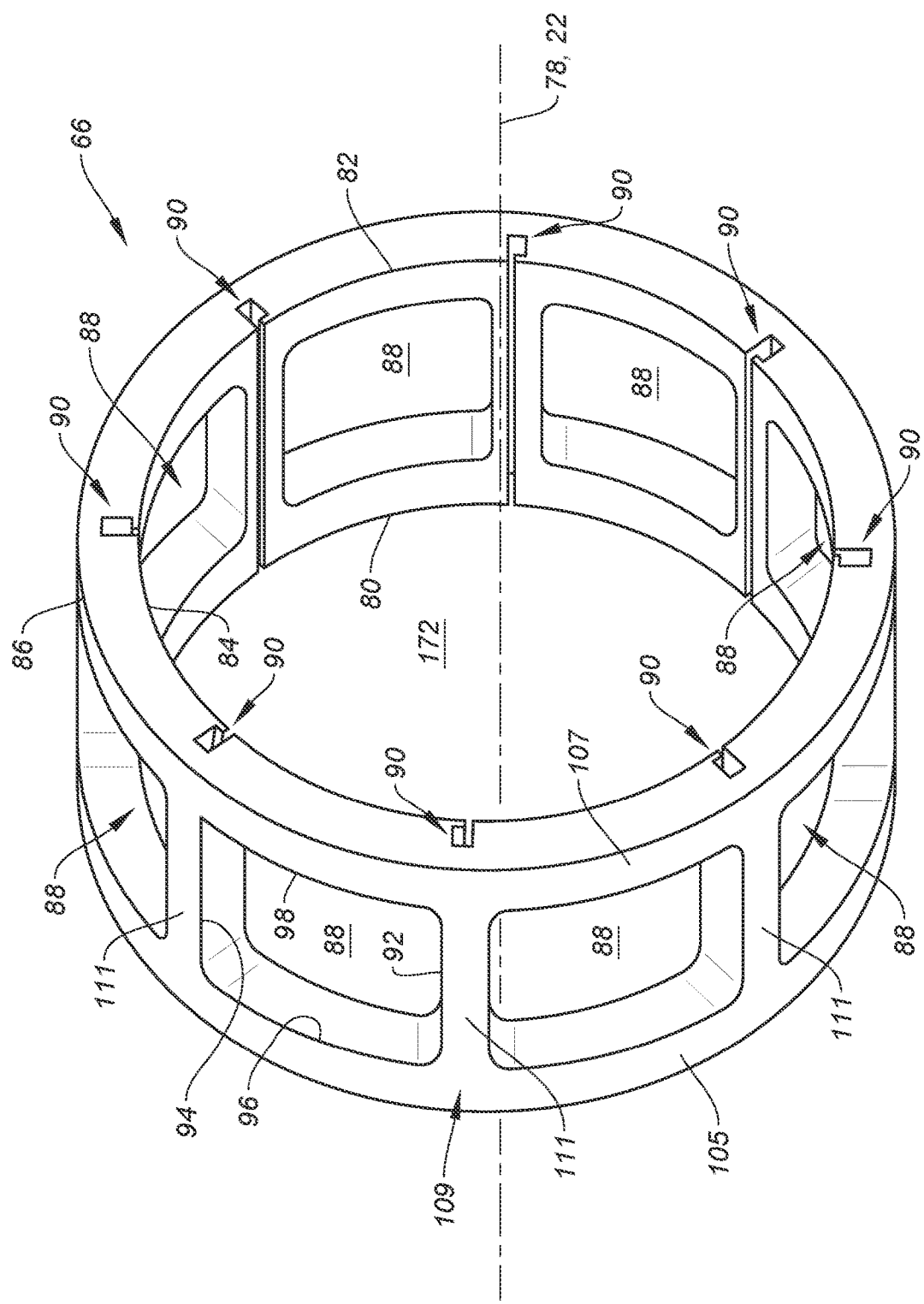
FIG. 3 is a perspective illustration of a frame for the magnetic-foil bearing.

Referring to FIG. 3, the MFB frame 66 extends axially along an axis 78 (e.g., the centerline 22) between and to a first end 80 of the MFB frame 66 and a second end 82 of the MFB frame 66. Briefly, the axis 78 may be a centerline axis of the MFB stator 62 and/or any one or more of its members 66, 68 and/or 70 (see FIG. 2). The axis 78 may also or alternatively be a centerline axis and/or a rotational axis of the MFB rotor 64 and/or any one or more of its members 72 and/or 74 (see FIG. 2). The MFB frame 66 extends radially between and to a radial inner side 84 of the MFB frame 66 and a radial outer side 86 of the MFB frame 66. The MFB frame 66 extends circumferentially about (e.g., completely around) the axis 78. The MFB frame 66 may thereby have a full-hoop tubular geometry.

The MFB frame 66 of FIG. 3 includes a plurality of stator channels 88 arranged circumferentially about the axis 78 in an array; e.g., a circular array. The MFB frame 66 of FIG. 3 also includes one or more retention slots 90 arranged circumferentially about the axis 78 in an array; e.g., a circular array. These retention slots 90 may be circumferentially interspersed with the stator channels 88. Each retention slot 90 of FIG. 3, for example, is disposed circumferentially between a respective circumferentially neighboring (e.g., adjacent) pair of the stator channels 88. Similarly, each stator channel 88 of FIG. 3 is disposed circumferentially between a respective circumferentially neighboring pair of the retention slots 90.

Each stator channel 88 extends radially through the MFB frame 66 between and to the frame inner side 84 and the frame outer side 86. Each stator channel 88 extends circumferentially about the axis 78 within the MFB frame 66 between circumferentially opposing sides 92 and 94 of the respective stator channel 88. Each stator channel 88 extends axially along the axis 78 within the MFB frame 66 between axially opposing sides 96 and 98 of the respective stator channel 88. Each of the axial channel sides 96, 98 extends circumferentially about the axis 78 between the circumferential channel sides 92, 94. Each of the circumferential channel sides 92, 94 extends axially along the axis 78 between the axial channel sides 96, 98. Each axial channel side 96, 98 may meet each respective circumferential channel side 92, 94 at a rounded interior corner; e.g., a fillet.

Figure 4:
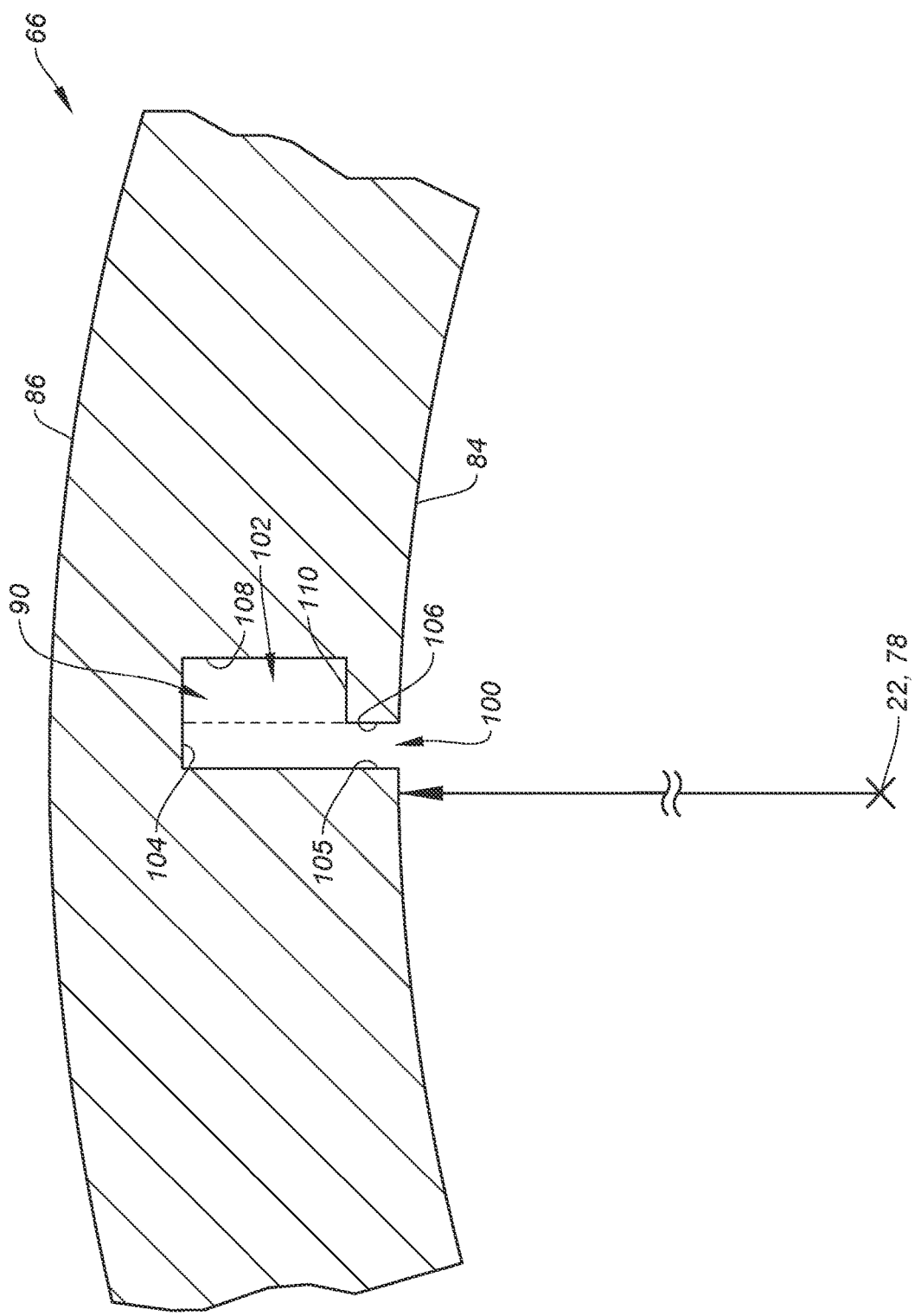
FIG. 4 is a partial cross-sectional illustration of the frame.

Each retention slot 90 extends axially through the MFB frame 66 between and to the frame first end 80 and the frame second end 82. Each retention slot 90 of FIG. 4 includes a groove 100 and a notch 102, where each of these slot members 100, 102 may extend axially through the MFB frame 66. The groove 100 projects radially into the MFB frame 66 (in a radial outward direction away from the axis 78) from the frame inner side 84 to a radial outer distal end 104 of the respective retention slot 90. The groove 100 extends laterally (e.g., circumferentially or tangentially) within the MFB frame 66 from a lateral first side 105 of the respective retention slot 90 to a lateral second side 106 of the groove 100. The notch 102 is disposed at (e.g., on, adjacent or proximate) the slot distal end 104. This notch 102 projects laterally out from the groove 100 and its groove second side 106 into the MFB frame 66 to a second side 108 of the respective retention slot 90. The notch 102 extends radially within the MFB frame 66 between and to the slot distal end 104 (e.g., a radial outer side of the notch 102) and a radial inner side 110 of the notch 102. With this configuration, the retention slot 90 of FIG. 4 has an L-shaped sectional geometry when viewed, for example, in a reference plane perpendicular to the axis 78. The present disclosure, however, is not limited to such an exemplary retention slot configuration. For example, in other embodiments, one or more of the retention slots 90 may each have a T-shaped sectional geometry (e.g., a geometry with double opposing notches) or a I-shaped sectional geometry (e.g., a geometry without a notch).

With the foregoing arrangement, the MFB frame 66 of FIG. 3 includes an annular first end portion 105, an annular second end portion 107 and an intermediation portion 109 extending axially between and connected to (e.g., formed integral with) the first end portion 105 and the second end portion 107. The first end portion 105 extends axially between and forms the frame first end 80 and the first axial channel side 96. The second end portion 107 extends axially between and forms the frame second end 82 and the second axial channel side 98. The intermediate portion 109 of FIG. 3 is formed by a plurality of beams 111 arranged circumferentially about the axis 78 in an array; e.g., a circular array. Each of these beams 111 extends circumferentially between and forms a respective set of the circumferential channel sides 92 and 94 of a respective circumferentially neighboring pair of the respective stator channel 88. Each of these beams 111 also includes a respective one of the retention slots 90.

The MFB frame 66 may be constructed as a monolithic body from frame material. The MFB frame 66, for example, may be cast, machined, additively manufactured and/or otherwise formed as a single, unitary body. The frame material may be a metal such as, but not limited to, Inconel 718, 304 stainless steel, 400 series steel, silicon steel, titanium 6AL-4V and 316 stainless steel. Additionally or in the alternative, the frame material may be a composite material, such as carbon fiber, fiberglass, or the like, a plastic material, and/or a combination of the foregoing and/or a metal material. The present disclosure, however, is not limited to such an exemplary frame construction nor frame materials.

Figure 5:
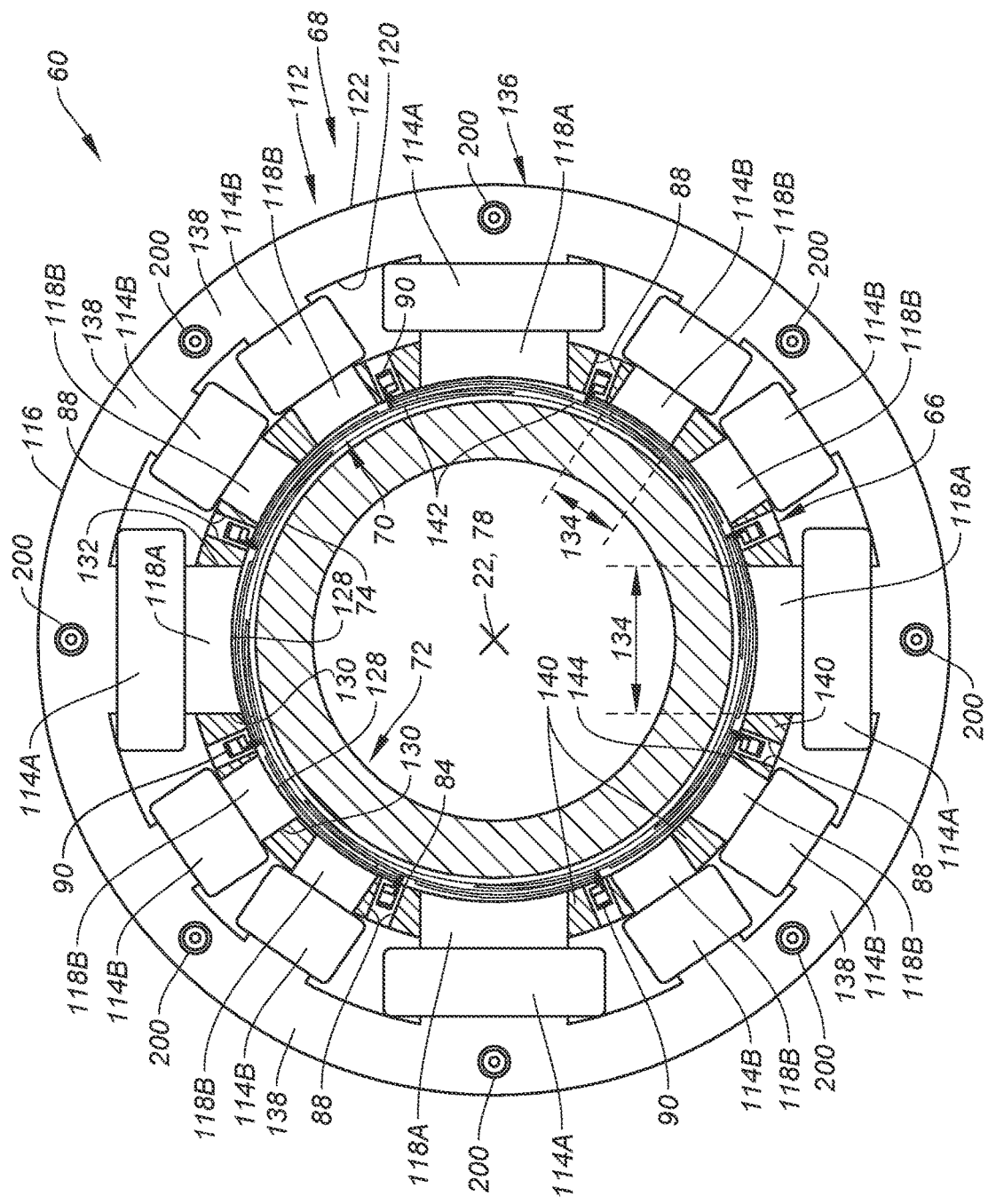
FIG. 5 is a cutaway illustration of the magnetic-foil bearing.

Referring to FIG. 5, the bearing stator 68 includes a stator body 112 and a plurality of electrical windings 114A and 114B (generally referred to as "114"); e.g., copper wire windings. The stator body 112 of FIG. 5 includes a stator body base 116 ("stator base") and a plurality of stator body protrusions 118A and 118B (generally referred to as "118") ("stator protrusions"); e.g., inward facing teeth.

Figure 6:
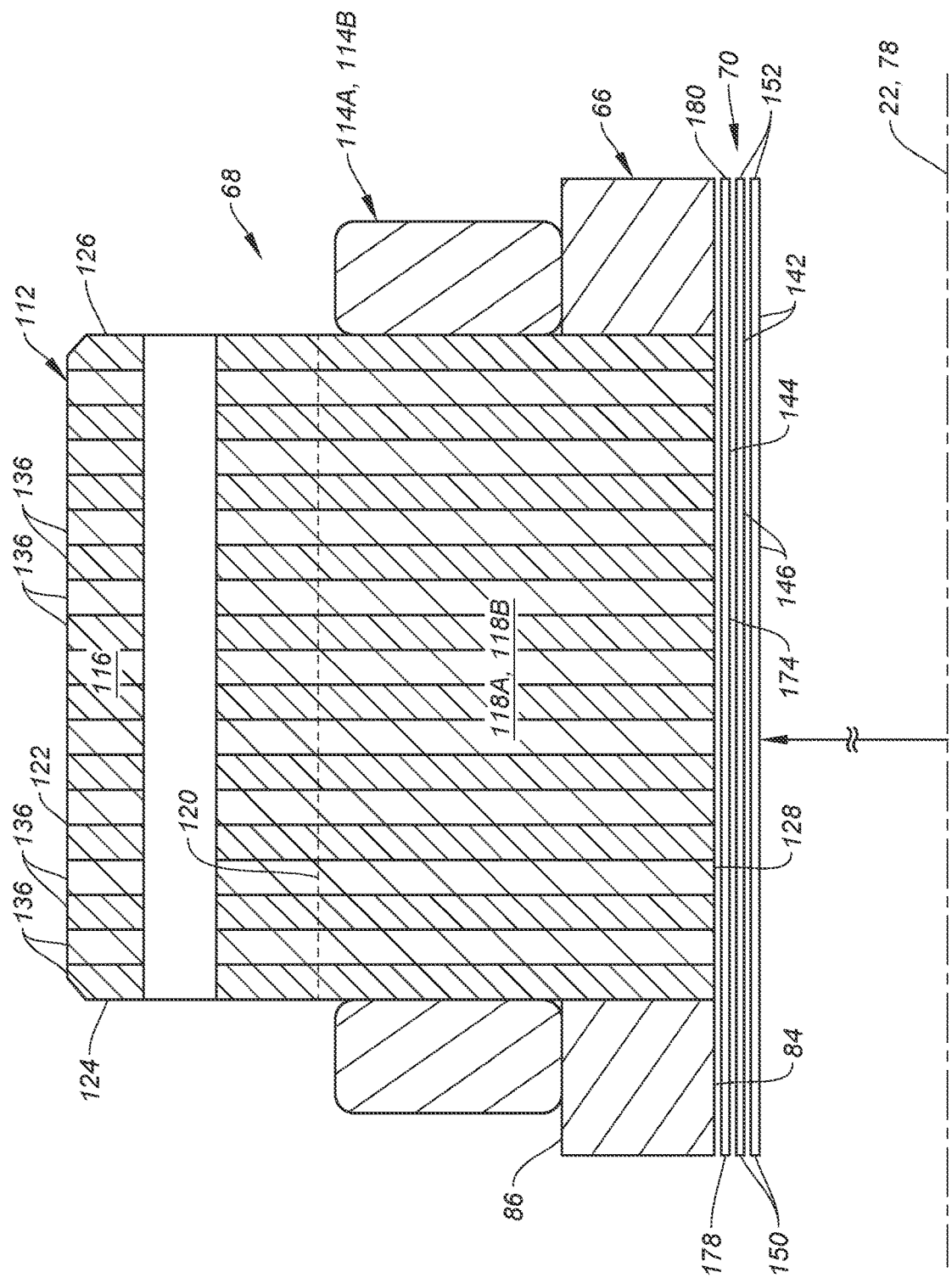
FIG. 6 is a partial side sectional illustration of a stator of the magnetic-foil bearing.

The stator base 116 extends circumferentially about (e.g., completely around) the axis 78. The stator base 116 and, more generally, the stator body 112 may thereby have a full-hoop tubular geometry. The stator base 116 extends radially between and to a radial inner side 120 of the stator base 116 and a radial outer side 122 of the bearing stator 68 and its stator body 112. Referring to FIG. 6, the stator base 116 extends axially along the axis 78 between and to a first end 124 of the stator body 112 and a second end 126 of the stator body 112.

Referring to FIG. 5, the stator protrusions 118A and 118B are collectively arranged circumferentially about the axis 78 in an array; e.g., a circular array. More particularly, the stator protrusions 118A of FIG. 5 are arranged circumferentially about the axis 78 in a first array. The stator protrusions 118B are arranged circumferentially about the axis 78 in a second array. The stator protrusions 118B are interspersed with stator protrusions 118A. Each stator protrusion 118A of FIG. 5, for example, is disposed circumferentially between a respective circumferentially neighboring pair of the stator protrusions 118B. Similarly, each set of two (or more) stator protrusions 118B is disposed (e.g., side-by-side) circumferentially between a respective circumferentially neighboring pair of the stator protrusions 118A. However, various other patterns of stator protrusions 118A and 118B about the axis 78 are possible. Furthermore, it is contemplated the stator body 112 may be configured without the stator protrusions 118A or the stator protrusions 118B in still other embodiments where, for example, all of the stator protrusions 118 have a common configuration.

Each stator protrusion 118 is connected to (e.g., formed integral with) the stator base 116 at its base inner side 120. Each stator protrusion 118 projects radially out from the stator base 116 (in a radial inward direction towards the axis 78) to a radial inner distal end 128 of the respective stator protrusion 118. This protrusion distal end 128 is located at a radial inner side of the bearing stator 68 and its stator body 112, and may have an arcuate geometry. Each stator protrusion 118 extends laterally between laterally opposing sides 130 and 132 of the respective stator protrusion 118, which defines a lateral width 134 of that stator protrusion 118. This lateral width 134 may be uniform (e.g., constant) along a radial length of the respective stator protrusion 118. The stator protrusions 118A may be configured with common (the same) lateral widths 134. Similarly, the stator protrusions 118B may be configured with common (the same) lateral widths 134. However, the lateral width 134 of each stator protrusion 118A is different (e.g., greater) than the lateral width 134 of each stator protrusion 118B. Referring to FIG. 6, each stator protrusion 118 extends axially along the axis 78 between and to the body first end 124 and the body second end 126.

The stator body 112 may be configured as or otherwise include a stator lamination. The stator body 112 of FIG. 6, for example, is formed from a plurality of stator body layers 136 (e.g., plates, etc.) arranged side-by-side along the axis 78 in a stack. Each of these stator body layers 136 (e.g., completely) forms a corresponding axial section of the stator body 112. Each stator body layer 136, for example, may form a respective axial section of the stator base 116 and a respective axial section of each stator protrusion 118. Referring to FIG. 5, each stator body layer 136 may include one or more circumferential segments 138, where these circumferential segments 138 are arranged circumferentially about the axis 78 to provide the respective stator body layer 136 with an annular geometry. However, it is contemplated each stator body layer 136 may alternatively be circumferentially unsegmented. Each of the stator body layers 136 may be formed from a ferromagnetic material such as, but not limited to, SiFe (silicon steel, electrical steel, etc.), HiperCo 50, tungsten steel, carbon steel, cobalt, magnetite and nickel. The present disclosure, however, is not limited to such an exemplary laminated configuration nor stator body materials.

Referring to FIG. 5, the stator windings 114 are arranged circumferentially about the axis 78 in an array; e.g., a circular array. Each of the stator windings 114A, 114B is configured with a respective one of the stator protrusions 118A, 118B. Each of the stator windings 114A, 114B of FIG. 5, for example, is wrapped around the respective stator protrusion 118A, 118B, for example radially at the base inner side 120. With this arrangement, the stator windings 114 are spaced radially outward from the stator inner side and the distal ends 128, and the stator base 116 circumscribes the array of the stator windings 114. Each of the stator windings 114A, 114B may also be bonded and/or otherwise attached to the respective stator protrusion 118A, 118B.

The bearing stator 68 is mated with and held together by the MFB frame 66. Each of the stator protrusions 118A is received by a respective one of the stator channels 88. More particularly, each stator protrusion 118A projects radially into (e.g., and through) the respective stator channel 88. Each respective set of the stator protrusions 118B is received by a respective one of the stator channels 88. More particularly, each stator protrusion 118B in each respective set projects radially into (e.g., and through) the respective stator channel 88, which facilitates setting a distance between each stator protrusion 118B and the magnetic bearing rotor 72. Furthermore, each of the stator protrusions 118 is attached to the MFB frame 66. Potting material 140, for example, may be disposed in each stator channel 88 about the respective stator protrusion(s) 118 to attach the respective stator protrusion(s) 118 to the MFB frame 66. This potting material 140 may mechanically retain the respective stator protrusion(s) 118 within the respective stator channel 88 and/or bond the respective stator protrusion(s) 118 to the MFB frame 66. Of course, various other techniques may also or alternatively be used to attach the stator protrusions 118 to the MFB frame 66.

When the bearing stator 68 is mated with the MFB frame 66, the body inner side may be radially aligned with the frame inner side 84. Thus, the protrusion distal ends 128 may be radially inline with the frame inner side 84. The stator base 116 is disposed radially outboard of the MFB frame 66. The stator body 112 and its stator base 116 may thereby circumscribe the MFB frame 66. Furthermore, each of the windings 114 is arranged radially outboard of the MFB frame 66, radially between the MFB frame 66 and the stator base 116.

The foil bearing 70 includes one or more top foils 142 and one or more bump foils 144; however, it is contemplated the foil bearing 70 may also include one or more intermediate foils between the top foils 142 and the bump foils 144. The set of top foils 142 and the set of bump foils 144 are each respectively arranged about the axis 78 in an array; e.g., a circular array. Each top foil 142 is also paired with a respective one of the bump foils 144 as described below in further detail.

Figure 7:
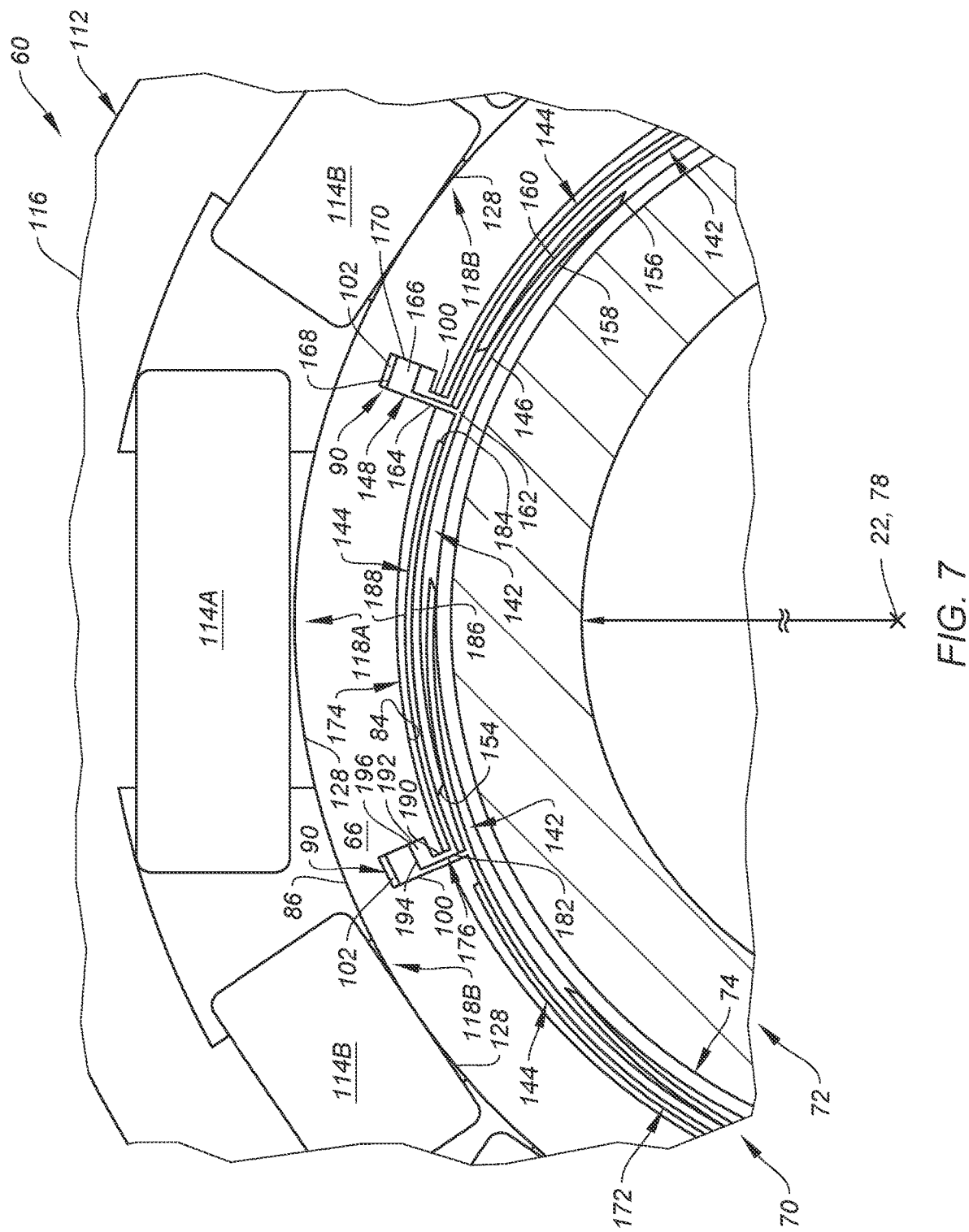
FIG. 7 is a partial cross-sectional illustration of the magnetic-foil bearing.

Each top foil 142 of FIG. 7 includes an arcuate top foil base 146 ("top base") and a top foil mount 148 ("top mount"). Referring to FIG. 6, each top foil 142 and its members 146 and 148 extends axially along the axis 78 between and to a first end 150 of the respective top foil 142 and a second end 152 of the respective top foil 142. Referring to again FIG. 7, the top base 146 extends circumferentially about the axis 78 between and to a first side 154 of the respective top foil 142 and a second side 156 of the respective top foil 142. The top base 146 extends radially between and to a radial inner side 158 of the respective top foil 142 and its top base 146 and a radial outer side 160 of the top base 146.

The top mount 148 is connected to (e.g., formed integral with) the top base 146 at a connection point 162. This connection point 162 may be disposed at a circumferential intermediate position between the opposing top foil sides 154 and 156. However, the connection point 162 may be closer circumferentially to the top foil second side 156 than the top foil first side 154. For example, the connection point 162 may be located between fifty percent (50%) and eighty percent (80%) of a circumferential length of the top foil 142 as measured from the top foil first side 154 to the top foil second side 156. The present disclosure, however, is not limited to such an exemplary arrangement.

The top mount 148 of FIG. 7 includes a top mount flange 164 ("top flange") and a top mount rim 166 ("top rim"). The top flange 164 projects radially out from the top base 146 (at the connection point 162) to a radial outer distal end 168 of the top mount 148 and its top flange 164. The top rim 166 is disposed at the top mount distal end 168. This top rim 166 projects laterally out from the top flange 164 to a lateral distal end 170 of the top rim 166. With this configuration, the top mount 148 of FIG. 7 has an L-shaped sectional geometry when viewed, for example, in a reference plane perpendicular to the axis 78. The present disclosure, however, is not limited to such an exemplary top mount configuration. For example, in other embodiments, the top mount 148 may have a T-shaped sectional geometry (e.g., a geometry with opposing double top rims) or a I-shaped sectional geometry (e.g., a geometry without a top rim).

Each top foil 142 is retained within an inner bore 172 of the MFB frame 66. More particularly, the top base 146 is disposed within the inner bore 172 and the top mount 148 is mated with a respective one of the retention slots 90. The top mount 148 and its top flange 164 project radially (in the radial outward direction) into the respective retention slot 90 and its groove 100. The top rim 166 projects laterally into the notch 102. The top mount 148 and its top rim 166 are thereby captured radially within the respective retention slot 90 and attached to the MFB frame 66.

When attached to the MFB frame 66, each top foil 142 may circumferentially overlap one or more of the other top foils 142. A first portion of each top base 146 at its first side 154 of FIG. 7, for example, is disposed radially between the MFB frame 66 and a second portion of a circumferentially adjacent top base 146 at its second side 156. Similarly, the second portion of each top base 146 at its second side 156 is disposed radially between the MFB frame 66 and the first portion of another circumferentially adjacent top base 146 at its first side 154. The top foils 142 may thereby be shingled circumferentially about the axis 78.

Each bump foil 144 of FIG. 7 includes an arcuate bump foil base 174 ("bump base") and a bump foil mount 176 ("bump mount"). Referring to FIG. 6, each bump foil 144 and its members 174 and 176 extends axially along the axis 78 between and to a first end 178 of the respective bump foil 144 and a second end 180 of the respective bump foil 144. Referring to again FIG. 7, the bump base 174 extends circumferentially about the axis 78 between and to a first side 182 of the respective bump foil 144 and a second side 184 of the respective bump foil 144. The bump base 174 extends radially between and to a radial inner side 186 of the respective bump foil 144 and its bump base 174 and a radial outer side 188 of the bump base 174.

The bump mount 176 is connected to (e.g., formed integral with) the bump base 174 at the bump foil first end 182. The bump mount 176 of FIG. 7 includes a bump mount flange 190 ("bump flange") and a bump mount rim 192 ("bump rim"). The bump flange 190 projects radially out from the bump base 174 (at the bump foil first side 182) to a radial outer distal end 194 of the bump mount 176 and its bump flange 190. The bump rim 192 is disposed at the bump mount distal end 194. This bump rim 192 projects laterally out from the bump flange 190 to a lateral distal end 196 of the bump rim 192. With this configuration, the bump mount 176 of FIG. 7 has an L-shaped sectional geometry when viewed, for example, in a reference plane perpendicular to the axis 78. The present disclosure, however, is not limited to such an exemplary bump mount configuration. For example, in other embodiments, the bump mount 176 may have a T-shaped sectional geometry (e.g., a geometry with opposing double bump rims) or a I-shaped sectional geometry (e.g., a geometry without a bump rim).

Each bump foil 144 is retained within the inner bore 172 of the MFB frame 66. More particularly, the bump base 174 is disposed within the inner bore 172 and the bump mount 176 is mated with a respective one of the retention slots 90. The bump mount 176 and its bump flange 190 project radially (in the radial outward direction) into the respective retention slot 90 and its groove 100. The bump rim 192 projects laterally into the notch 102. The bump mount 176 and its bump rim 192 are thereby captured radially within the respective retention slot 90 and attached to the MFB frame 66. In the arrangement of FIG. 7, the bump mount 176 and its bump flange 190 are disposed circumferentially between (a) the top mounts 148 and its top flange 164 and (b) the lateral second side 106 of the groove 100 (see FIG. 4). The bump mount 176 and its bump rim 192 are also disposed radially between (a) the top mount 148 and its top rim 166 and (b) the radial inner side 110 of the notch 102 (see FIG. 4).

When attached to the MFB frame 66, each bump foil 144 is configured to bias one or more of the top foils 142 radially inward away from the MFB frame 66 and its frame inner side 84. Each bump foil 144, for example, is configured as a cantilevered leaf spring that pushes in the radial inward direction against the radial outer side 160 of a respective top base 146. In the arrangement of FIG. 7, the bump base 174 is disposed radially between the MFB frame 66 and a circumferentially overlapping set of the top foils 142 and their top bases 146.

Referring to FIG. 5, when the MFB stator 62 is assembled, the MFB frame 66 is axially aligned with (e.g., extends axially along, axially overlaps, etc.) and circumscribes the foil bearing 70 and its foils 142 and 144. Similarly, the bearing stator 68 and its stator body 112 are axially aligned with and circumscribe the foil bearing 70 and its foils 142 and 144. The bearing stator 68 and the foil bearing 70 are thereby radially stacked using the MFB frame 66. This radial stacking of the bearing stator 68 with the foil bearing 70 may reduce an axial footprint/overall volume of the magnetic-foil bearing 60; e.g., compared to if the bearing stator 68 and the foil bearing 70 were arranged axially side-by-side or otherwise arranged. In addition, the foil bearing 70 and its foils 142 and 144 may be mounted without bedding the foils 142 and/or 144 in the potting material about the stator body 112 and its stator protrusion 118.

Referring to FIG. 2, the MFB stator 62 is fixed to engine housing 34. The MFB stator 62 of FIG. 2, for example, is secured (e.g., mechanically fastened) to a bearing carrier 198 (e.g., a housing structure or housing member). The bearing carrier 198 is secured (e.g., mechanically fastened) to the inner case 36 through a support structure, where at least this support structure, the bearing carrier 198 and the inner case 36 may collectively form a stationary structure of the turbine engine 20. To secure the MFB stator 62 to the bearing carrier 198, the bearing stator 68 and its stator base 116 are mechanically fastened to the bearing carrier 198 by one or more fasteners 200; e.g., bolts. Each of these fasteners 200 projects axially through the stator base 116 (and its layers 136 of FIG. 6) and is threaded into a respective fastener aperture in the bearing carrier 198. With the foregoing arrangement, the MFB stator 62 and its various members may be installed and removed as a single unit without, for example, disturbing the potting material.

The bearing rotor 72 may be configured as a rotor lamination; e.g., similar to the stator lamination of FIG. 6. This bearing rotor 72 is mounted to a rotating structure 202 of the turbine engine 20, which rotating structure 202 may include one of the engine shafts 48, 49, 50 of FIG. 1. The bearing rotor 72 of FIG. 2, for example, circumscribes and is attached to the rotating structure 202 such that the bearing rotor 72 is rotatable with the rotating structure 202. Similarly, the rotor sleeve 74 is mounted to the rotating structure 202 and/or the bearing rotor 72. The rotor sleeve 74 of FIG. 2, for example, circumscribes the bearing rotor 72 and is attached to the bearing rotor 72 and/or the rotating structure 202 such that the rotor sleeve 74 is also rotatable with the rotating structure 202. The MFB rotor 64 is also mated with the MFB stator 62. More particularly, the MFB rotor 64 and its members 72 and 74 are disposed within an inner bore of the MFB stator 62 and its foil bearing 70. The MFB stator 62 and each of its members 66, 68 and 70 are thereby axially aligned with and circumscribe the MFB rotor 64 and each of its members 72 and 74.

Figure 8:
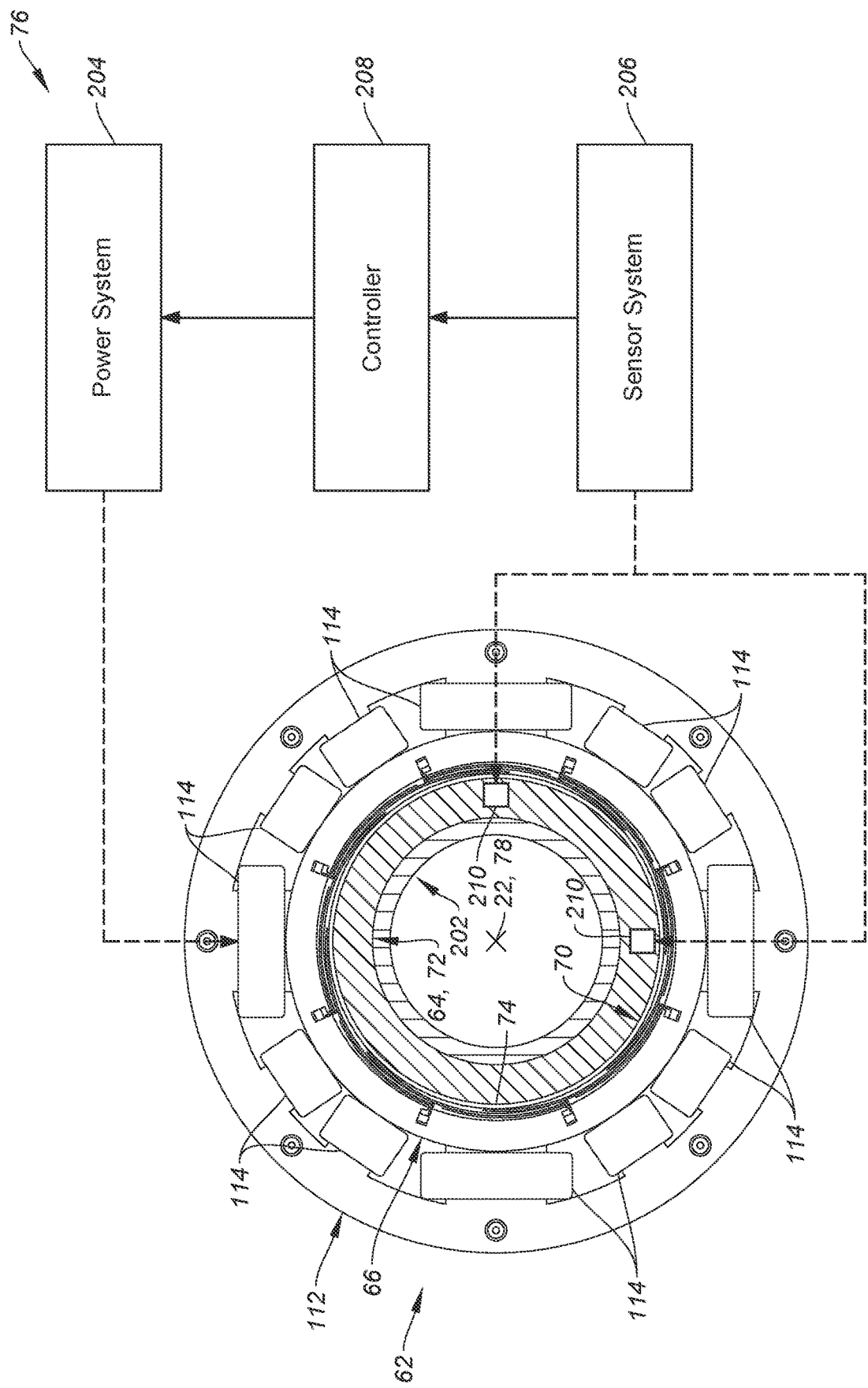
FIG. 8 is a schematic, cross-sectional illustration of the magnetic-foil bearing with the rotating structure and a control system.

Referring to FIG. 8, the control system 76 includes a power system 204, a sensor system 206 and a controller 208 in signal communication (e.g., hardwired and/or wirelessly coupled to) the power system 204 and the sensor system 206. The power system 204 is electrically coupled to the MFB stator 62 and each of its windings 114. This power system 204 is configured to supply electricity to the MFB stator 62 and each of its windings 114 for operation. The sensor system 206 includes one or more sensors 210 (e.g., proximity sensors) arranged with the MFB rotor 64. The sensor system 206 is configured to determine a radial position of the MFB rotor 64 relative to the MFB stator 62. The controller 208 is configured to signal the power system 204 to selectively energize the windings 114 in order to maintain the MFB rotor 64 coaxial with the MFB stator 62 based on sensor feedback provided by the sensor system 206.

The active magnetic bearing and foil bearing functionalities of the magnetic-foil bearing 60 may complement one another during turbine engine operation. For example, as the rotating structure 202 initially begins to rotate, stops or otherwise rotates relatively slowly (e.g., during windmilling, etc.), the foil bearing 70 may provide support for the MFB rotor 64 within the MFB stator 62. During high speed operation, a magnetic field generated by the bearing stator 68 may support rotation of the MFB rotor 64 within the MFB stator 62. However, load capacity of the magnetic field may be strengthened by also providing an air cushion between the rotor sleeve 74 and the foil bearing 70. This air cushion is generated by the rotation of the rotor sleeve 74 within the foil bearing 70. The magnetic-foil bearing 60 of the present disclosure thereby provides a high load capacity, relatively low friction bearing; e.g., which may utilize no lubricant at the interface between the MFB stator 62 and the MFB rotor 64. The foil bearing 70 also provides a backup to the active magnetic bearing functionality.

While the magnetic-foil bearing 60 may reduce cooling demands on the turbine engine 20 relative to a typical roller element bearing (particularly lubricant cooling demands), the magnetic-foil bearing 60 may still generate/be subject to heat loads. These heat loads may be generated by conversion of electrical current within the windings 114 into electromagnetic flux, excitations induced by the electromagnetic flux and/or viscous shear in the air cushion between the MFB stator 62 and the MFB rotor 64. If unmitigated, such heat loads may negatively affect operation and/or durability of the magnetic-foil bearing 60, particularly components of the bearing stator 68 such as the windings 114. The magnetic-foil bearing 60 of FIG. 9 therefore is configured with a cooling system 212.

Figure 9:
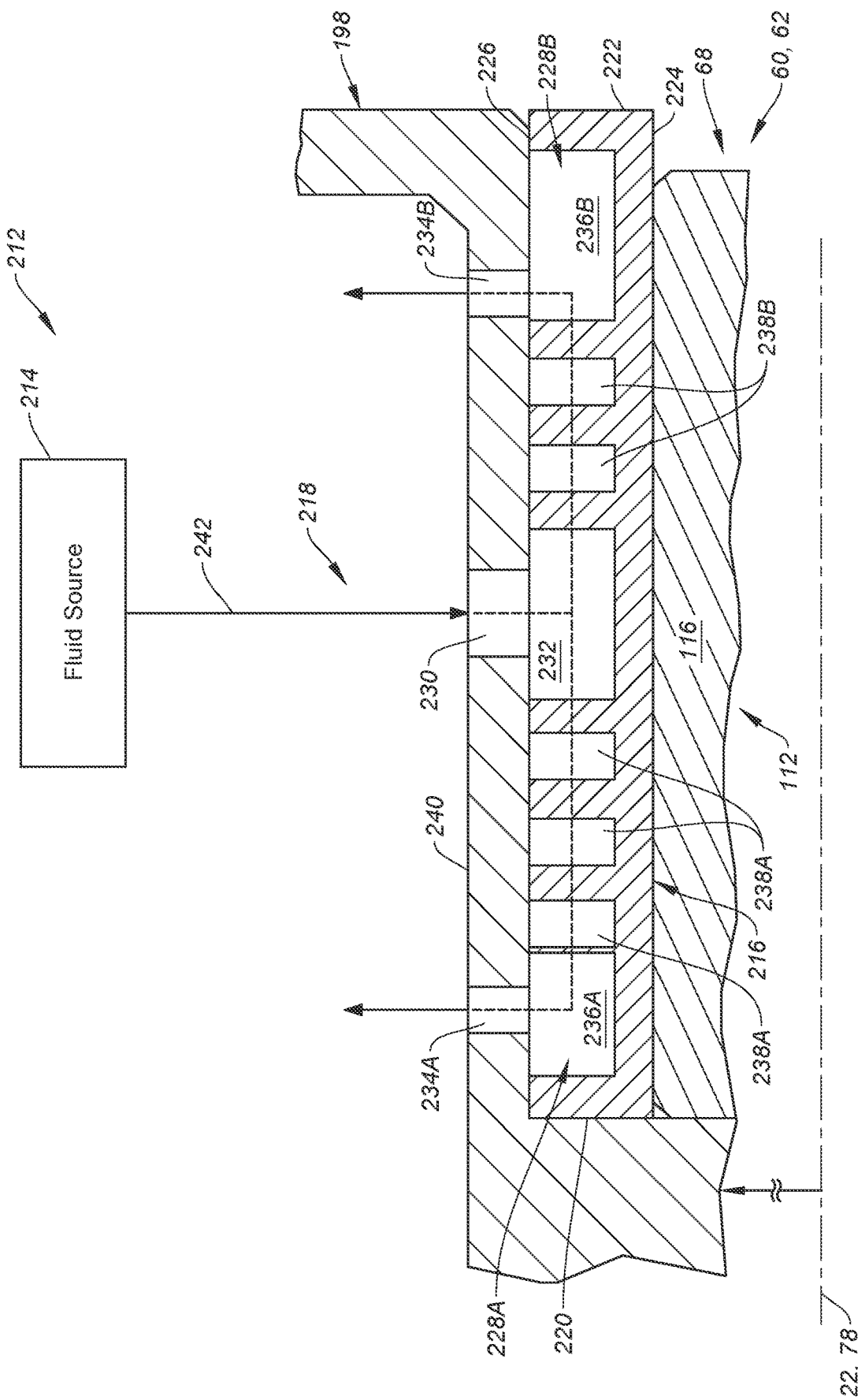
FIG. 9 is a partial side sectional illustration of a cooling system with a cooling jacket between the stationary structure and the magnetic-foil bearing.

The cooling system 212 of FIG. 9 includes a cooling fluid source 214, a magnetic-foil bearing (MFB) cooling jacket 216 and a magnetic-foil bearing (MFB) cooling circuit 218. Briefly, the cooling circuit 218 of FIG. 9 is fluidly coupled with the cooling fluid source 214 and extends through (e.g., is configured as part of) the cooling jacket 216. This cooling circuit 218 is configured to deliver cooling fluid received from the cooling fluid source 214 to the cooling jacket 216 for cooling the magnetic-foil bearing 60.

The cooling fluid may be a gas such as cooling air; e.g., compressed bleed air. The cooling fluid source 214, for example, may be configured as a section of the turbine engine 20 of FIG. 1 along the core flowpath 54. The cooling fluid source 214 may be configured as the compressor section 29. With such an arrangement, some of the compressed core air may be bled from the core flowpath 54 along or at a downstream end of the HPC section 29B and directed into the cooling circuit 218 of FIG. 9. Alternatively, the cooling fluid source 214 may be configured as the combustor section 30. With such an arrangement, some of the compressed core air may be bled from a pre-diffuser leading to a diffuser plenum surrounding the combustor (or bled from the diffuser plenum itself) and directed into the cooling circuit 218 of FIG. 9. The present disclosure, however, is not limited to the foregoing exemplary air cooling fluid source configurations. The cooling fluid source 214, for example, may alternatively be configured as the bypass flowpath 56 or various other available air sources (e.g., ram air) in or about the turbine engine 20 depending upon, for example, pressure requirements for the cooling air about the magnetic-foil bearing 60. The cooling fluid source 214, for course, may also include or otherwise be configured with a flow regulator (e.g., a valve) for metering a flow of the cooling fluid to the cooling circuit 218.

The cooling fluid may alternatively be a liquid such as lubricant (e.g., engine oil, fuel, etc.) and/or coolant (e.g., refrigerant, water, etc.). The cooling fluid source 214, for example, may include a reservoir and a flow regulator; e.g., a valve and/or a pump. The reservoir may be configured to store the cooling fluid before, during and/or after magnetic-foil bearing operation. The reservoir, for example, may be configured as or otherwise include a tank, a cylinder, a pressure vessel, a bladder or any other type of fluid storage container. The flow regulator may be configured to direct and/or meter a flow of the cooling fluid from the reservoir to the cooling circuit 218. The reservoir may be associated with another system (e.g., an oil system, a fuel system, etc.) of the turbine engine 20, or the reservoir may be independent of (e.g., all) other engine systems.

Figure 10:
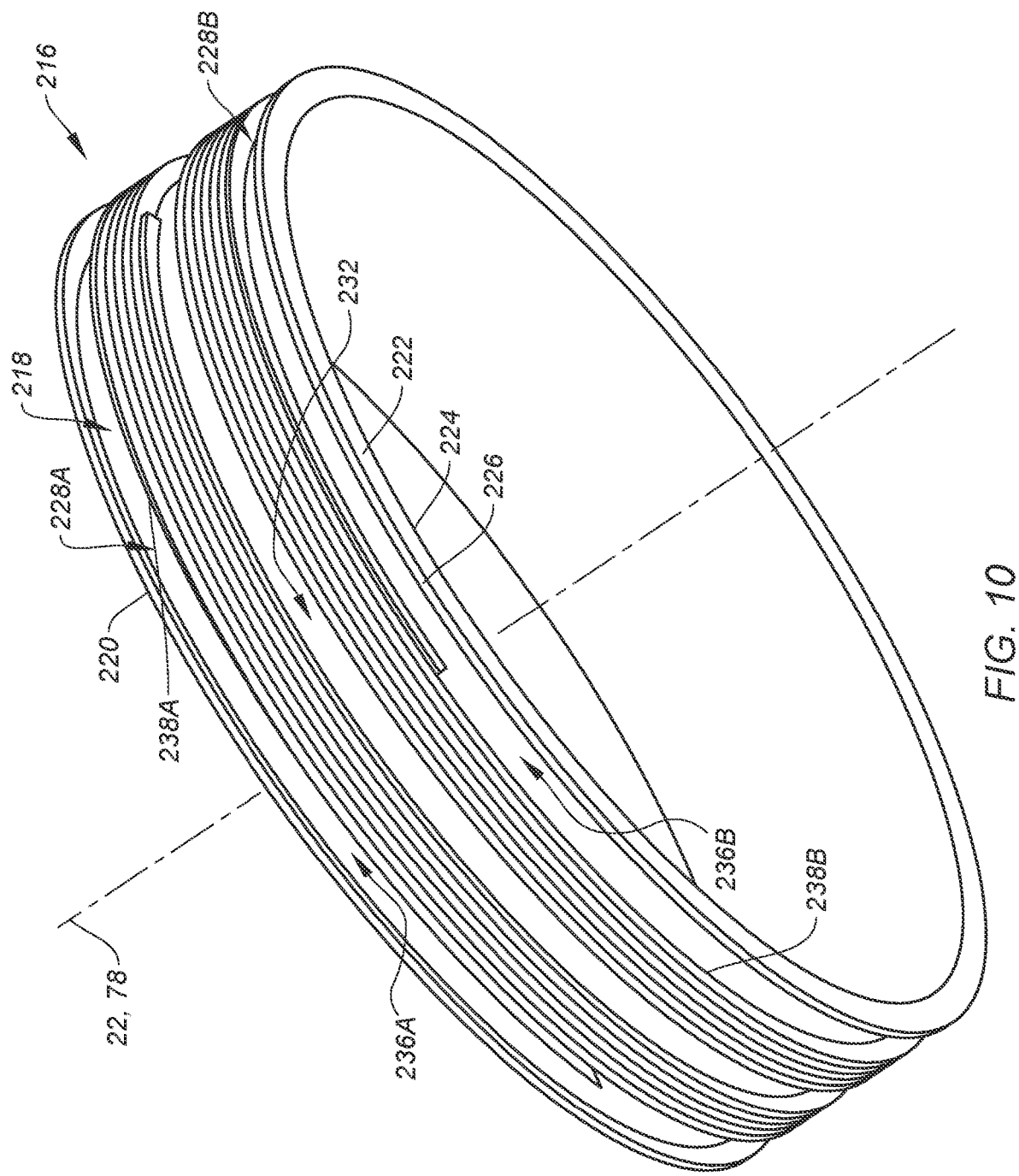
FIG. 10 is a perspective illustration of the cooling jacket.

The cooling jacket 216 extends axially along the axis 78 between and to a first end 220 of the cooling jacket 216 and a second end 222 of the cooling jacket 216. The cooling jacket 216 extends radially between and to a radial inner side 224 of the cooling jacket 216 and a radial outer side 226 of the cooling jacket 216. The cooling jacket 216 extends circumferentially about (e.g., completely around) the axis 78. The cooling jacket 216 may thereby have a full-hoop tubular geometry; e.g., see FIG. 10.

The cooling jacket 216 of FIG. 9 at least partially forms one or more channels 228A and 228B (generally referred to as "228") of the cooling circuit 218. These cooling channels 228 are fluidly coupled in parallel with and downstream of a common inlet 230 into the cooling jacket 216 through an inlet plenum 232 of the cooling circuit 218; e.g., an inlet manifold for the cooling channels 228. Each of the cooling channels 228A, 228B extends within the cooling jacket 216 from the inlet plenum 232 to a respective outlet 234A, 234B (generally referred to as "234") (or multiple respective outlets) from the cooling jacket 216. Each cooling channel 228A, 228B of FIG. 9 includes a respective outlet plenum 236A, 236B (generally referred to as "236") (e.g., an outlet manifold for the respective cooling channel 228) and a passage leg 238A, 238B (generally referred to as "238"). Here, each of the cooling circuit members 232, 236, 238 of FIG. 9 is formed radially between and collectively by (a) the cooling jacket 216 and (b) the bearing carrier 198 and a tubular shroud 240 of the bearing carrier 198. The present disclosure, however, is not limited to such an exemplary arrangement. One or more of the cooling circuit members 232, 236 and/or 238, for example, may alternatively be embedded radially within the cooling jacket 216 as, for example, a microcircuit passage.

Each of the plenums 232, 236A, 236B of FIG. 9 projects radially into the cooling jacket 216 from the jacket outer side 226. Each of the plenums 232, 236A, 236B extends axially within the cooling jacket 216 between opposing axial sides of that respective plenum 232, 236A, 236B. Each of the plenums 232, 236A, 236B extends within the cooling jacket 216 circumferentially about (e.g., completely around) the axis 78, for example providing that respective plenum 232, 236A, 236B with a full-hoop (e.g., annular) geometry; e.g., see also FIG. 10. The inlet plenum 232 is disposed at an axial intermediate location axially between the first outlet plenum 236A and the second outlet plenum 236B as well as axially between the first passage leg 238A and the second passage leg 238B. This inlet plenum 232 is fluidly coupled with, axially aligned with and radially below the jacket inlet 230. The first outlet plenum 236A is disposed at or near the jacket first end 220. This first outlet plenum 236A is fluidly coupled with, axially aligned with and radially below the first jacket outlet 234A. The second outlet plenum 236B is disposed at or near the jacket second end 222. This second outlet plenum 236B is fluidly coupled with, axially aligned with and radially below the second jacket outlet 234B.

Each of the passage legs 238 of FIG. 9 projects radially into the cooling jacket 216 from the jacket outer side 226. Each of the passage legs 238A, 238B may extend within the cooling jacket 216 axially along and/or circumferentially about the axis 78 between the inlet plenum 232 and the respective outlet plenum 236A, 236B. At least a portion or an entirety of each passage leg 238 of FIG. 10, for example, has a spiral geometry. More particularly, each passage leg 238A, 238B of FIG. 10 spirals at least one, two or more (e.g., complete) revolutions about the axis 78 as that respective passage leg 238A, 238B extends within the cooling jacket 216 from the inlet plenum 232 to the respective outlet plenum 236A, 236B. By spiraling around the axis 78 (and, thus the magnetic-foil bearing 60 and stator base 116; see FIGS. 5-7), a total contact surface area for the cooling within the cooling jacket 216 may be increased.

Referring to FIG. 9, the cooling jacket 216 is arranged radially between the stator body 112 and the bearing carrier 198. The cooling jacket 216 of FIG. 9, for example, is arranged radially between the stator base 116 and the shroud 240. The bearing carrier 198 and its shroud 240 are axially aligned with and extend circumferentially about (e.g., circumscribe) the cooling jacket 216. The cooling jacket 216 is axially aligned with and extends circumferentially about (e.g., circumscribes) the magnetic-foil bearing 60 and stator base 116. Moreover, the cooling jacket 216 radially engages (e.g., is abutted against, contacts, etc.) and/or is otherwise in thermal communication with the stator body 112 and its stator base 116. The stator base 116, for example, may be connected to the cooling jacket 216 through an interference fit and/or a bonded (e.g., a welded, brazed, etc.) connection. Similarly, the cooling jacket 216 may be connected to the shroud 240 through an interference fit and/or a bonded (e.g., a welded, brazed, etc.) connection.

The cooling circuit 218 includes the cooling circuit members 232, 236 and 238 as well as a source passage 242. This source passage 242 fluidly couples the cooling fluid source 214 to the cooling circuit members 232, 236 and 238 and, thus, the cooling jacket 216.

During operation of the cooling system 212, the cooling circuit 218 directs the cooling fluid received from the cooling fluid source 214 through the cooling jacket 216. As the cooling fluid passes through the cooling circuit members 232, 236 and 238, heat energy is transferred from the stator body 112 and its stator base 116 into the cooling fluid flowing through the cooling circuit 218. The cooling system 212 and its cooling jacket 216 therefore may cool the stator body 112 and its stator base 116. The cooling system 212 and its cooling jacket 216 may also cool one or more of the windings 114 and/or the foil bearing 70 and its elements 142 and/or 144 (see FIGS. 5-7) where, for example, the stator body 112 transfers (e.g., conducts) heat energy from those MFB components to the cooling jacket 216. Following discharge from the cooling jacket 216 through the jacket outlets 234, the (now heated) cooling fluid may be directed out of a bearing compartment housing the magnetic-foil bearing 60 and used for cooling (and/or lubricating) other turbine engine components or exhausted from the turbine engine 20.

The magnetic-foil bearing(s) 60 may be included in various turbine engines other than the one described above as well as in other types of rotational equipment. The magnetic-foil bearing(s) 60, for example, may be included in a geared turbine engine where a geartrain connects one or more shafts to one or more rotors in a fan section, a compressor section and/or any other engine section. Alternatively, the magnetic-foil bearing(s) 60 may be included in a turbine engine configured without a geartrain; e.g., a direct drive turbine engine. The magnetic-foil bearing(s) 60 may be included in a geared or non-geared turbine engine configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines. Moreover, the magnetic-foil bearing(s) 60 may be utilized in various types of rotational equipment other than turbine engines. The magnetic-foil bearing(s) 60, for example, may be utilized in automotive or other land-based vehicle applications within an engine and/or a drivetrain.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A bearing system, comprising:
a stationary structure;
a rotating structure rotatable about an axis;
a magnetic-foil bearing radially supporting the rotating structure within the stationary structure, the magnetic-foil bearing including a magnetic bearing stator, a magnetic bearing rotor and a foil bearing, wherein the foil bearing is disposed radially between the magnetic bearing stator and the magnetic bearing rotor;
a cooling jacket circumscribing and radially engaging the magnetic bearing stator, a cooling circuit configured to flow cooling fluid within the cooling jacket to cool the magnetic bearing stator; and
a cooling fluid source fluidly coupled with and configured to provide the cooling fluid to the cooling circuit, wherein the cooling fluid source comprises a flowpath within a turbine engine, and the cooling fluid is compressed air bled from the flowpath.

2. The bearing system of claim 1, wherein the cooling circuit extends circumferentially within the cooling jacket around the magnetic bearing stator two or more complete revolutions.

3. The bearing system of claim 1, wherein at least a portion of the cooling circuit within the cooling jacket has a spiral geometry about the magnetic bearing stator.

4. The bearing system of claim 1, wherein
the cooling circuit includes a first leg and a second leg;
the first leg extends within the cooling jacket axially along and circumferentially about a first portion of the magnetic bearing stator to a first outlet of the cooling jacket; and
the second leg extends within the cooling jacket axially along and circumferentially about a second portion of the magnetic bearing stator to a second outlet of the cooling jacket.

5. The bearing system of claim 4, wherein
the first leg extends within the cooling jacket axially along the first portion of the magnetic bearing stator in a first axial direction along the axis to the first outlet; and
the second leg extends within the cooling jacket axially along the second portion of the magnetic bearing stator in a second axial direction along the axis to the second outlet.

6. The bearing system of claim 4, wherein the first leg and the second leg are fluidly coupled to an inlet of the cooling jacket in parallel.

7. The bearing system of claim 4, wherein at least one of
at least a portion of the first leg has a spiral geometry within the cooling jacket about the magnetic bearing stator; or
at least a portion of the second leg has a spiral geometry within the cooling jacket about the magnetic bearing stator.

8. The bearing system of claim 4, wherein at least one of
the first leg extends within the cooling jacket at least one or more complete revolutions circumferentially about the magnetic bearing stator; or
the second leg extends within the cooling jacket at least one or more complete revolutions circumferentially about the magnetic bearing stator.

9. The bearing system of claim 1, wherein
the cooling circuit includes a first leg, a second leg, a first plenum, a second plenum and a third plenum axially between the first plenum and the second plenum;
the first leg extends axially along and circumferentially about the magnetic bearing stator from the first plenum to the third plenum; and
the second leg extends axially along and circumferentially about the magnetic bearing stator from the third plenum to the second plenum.

10. The bearing system of claim 9, wherein at least one of
the first plenum comprises an annular first plenum;
the second plenum comprises an annular second plenum; or
the third plenum comprises an annular third plenum.

11. The bearing system of claim 9, wherein the cooling jacket includes
an inlet fluidly coupled to the third plenum;
a first outlet fluidly coupled to the first plenum; and
a second outlet fluidly coupled to the second plenum.

12. The bearing system of claim 1, wherein
the magnetic bearing stator includes a stator body and a plurality of windings wrapped around the stator body; and
the cooling jacket circumscribes and radially engages the stator body.

13. The bearing system of claim 12, wherein the stator body comprises a stator lamination.

14. The bearing system of claim 1, wherein the foil bearing includes
a top foil extending circumferentially about the axis; and
a bump foil extending circumferentially about the axis and radially between the magnetic bearing stator and the top foil.

15. A bearing system, comprising:
a stationary structure;
a rotating structure rotatable about an axis;
a magnetic-foil bearing radially supporting the rotating structure within the stationary structure, the magnetic-foil bearing including a magnetic bearing stator, a magnetic bearing rotor and a foil bearing, wherein the foil bearing is disposed radially between the magnetic bearing stator and the magnetic bearing rotor;
a cooling jacket circumscribing and radially engaging the magnetic bearing stator, a cooling circuit configured to flow cooling fluid within the cooling jacket to cool the magnetic bearing stator; and
a cooling fluid source fluidly coupled with and configured to provide the cooling fluid to the cooling circuit, wherein the cooling fluid source comprises a lubricant reservoir, and the cooling fluid is lubricant from the lubricant reservoir.

16. An assembly for a turbine engine, comprising:
a stationary structure;
a rotating structure rotatable about an axis;
a bearing radially supporting the rotating structure within the stationary structure, the bearing including a magnetic bearing rotor and a magnetic bearing stator circumscribing the magnetic bearing rotor, the magnetic bearing rotor mounted with the rotating structure, and the magnetic bearing stator mounted with the stationary structure; and
a cooling jacket circumscribing and radially engaging the magnetic bearing stator, a cooling circuit configured to flow cooling fluid within the cooling jacket to cool the magnetic bearing stator, and at least a portion of the cooling circuit within the cooling jacket having a spiral geometry about the magnetic bearing stator.

17. The assembly of claim 16, wherein the bearing further includes a foil bearing radially between the magnetic bearing stator and the magnetic bearing rotor.

\* \* \* \* \*